United States Patent [19]
Lin

[11] Patent Number: 6,047,780
[45] Date of Patent: Apr. 11, 2000

[54] SPEED ADJUSTING APPARATUS FOR A PNEUMATICALLY DRIVEN POWER TOOL

[76] Inventor: Chen-Yang Lin, No. 51-2, Lane 490, Chung-Cheng S. Rd., Yang-Kang City, Tainan Hsien, Taiwan

[21] Appl. No.: 09/392,748

[22] Filed: Sep. 9, 1999

[30] Foreign Application Priority Data

Mar. 9, 1999 [TW] Taiwan .................................. 88203536

[51] Int. Cl.[7] .................................................. B23B 45/04
[52] U.S. Cl. ........................ 173/168; 173/93.5; 173/169; 173/221
[58] Field of Search ........................... 173/104, 93, 93.5, 173/168, 169, 218, 221

[56] References Cited

U.S. PATENT DOCUMENTS

| 3,924,693 | 12/1975 | Whitehouse | 173/169 |
|---|---|---|---|
| 5,303,781 | 4/1994 | Lin | 173/168 |
| 5,377,769 | 1/1995 | Hasuo et al. | 173/169 |
| 5,775,439 | 7/1998 | Biek | 173/93.5 |
| 5,918,686 | 7/1999 | Izumisawa | 173/221 |
| 5,964,302 | 10/1999 | Lin | 173/168 |

*Primary Examiner*—Scott A. Smith
*Attorney, Agent, or Firm*—Finnegan, Henderson, Farabow, Garrett & Dunner, L.L.P.

[57] ABSTRACT

A speed adjusting apparatus for a pneumatically driven power tool includes a control valve that is adapted to be mounted rotatably within an intake passageway in an outer housing. A connecting rod extends through a pivot hole in a rear cover, and interconnects the valve and a rotary member that is disposed rotatably on the rear cover in such a manner that the valve rotates synchronously with the rotary member. The rotary member can be rotated to align an intake outlet passageway in the valve with a selected one of a forward passageway and a reverse passageway in the rear cover. When the intake outlet passageway is aligned with the forward passageway, a tool head rotates in a direction. When the intake outlet passageway is aligned with the reverse passageway, the tool head rotates in the opposite direction. The tool head rotates at a speed, which depends on the intersecting area between the intake outlet passageway and the selected one of the forward passageway and the reverse passageway that is determined by the rotational angle of the rotary member relative to the rear cover.

5 Claims, 5 Drawing Sheets

SPEED ADJUSTING APPARATUS FOR A PNEUMATICALLY DRIVEN POWER TOOL

BACKGROUND OF THE INVENTION

1. Field of the Invention

This invention relates to a speed adjusting apparatus for a pneumatically driven power tool, which has a tool head that can rotate in two directions for driving nuts or bolts, more particularly to a speed adjusting apparatus, which can be operated to vary the rotational direction of the tool head.

2. Description of the Related Art

Referring to FIG. 1, a conventional pneumatically driven tool 1 is shown to include an outer housing 11 with a chamber 111 and a handle 112 that is disposed under the chamber 111. A driving mechanism 12 is mounted within the chamber 111, and includes an impact device, a front bearing member, an air cylinder with a rotor, and a rear bearing member 121. The rear bearing member 121 has a forward hole 122 and a reverse hole 123, which are formed therethrough. Because the improvement of this invention is not directed to the driving mechanism 12, a more detailed description thereof will be omitted herein. To introduce air into the air cylinder, the handle 112 has an intake passageway 113, a mounting passageway 114, and a connecting passageway 110 that intercommunicates the passageways 113, 114. The intake passageway 113 intersects an elongated positioning hole 115 at an upper end thereof. For the purpose of adjusting rotational speed and controlling rotational direction, the tool 1 further includes a rear cover 14 bolted onto a rear end of the outer housing 11, a rotational-direction controlling mechanism 15 mounted within the positioning hole 115, a speed adjusting valve 16 disposed within the intake passageway 113, and an air controlling mechanism 17 mounted within the mounting passageway 114.

The rotational-direction controlling mechanism 15 includes a tubular member 151 disposed within the positioning hole 115, and a control rod 152 that is mounted movably within the tubular member 151 and that has two annular grooves 153. The tubular member 151 has an intake port 154 that is communicated with the intake passageway 113, a forward air-controlling passageway 155 and a reverse air-controlling passageway 156 that are communicated respectively with two passageways 116 (only one is shown) in the outer housing 11. The passageways 116 are communicated respectively with a forward guiding slot 141 and a reverse guiding slot 142 in the rear cover 14 so as to guide air into the forward port 122 and the reverse port 123 in the rear bearing member 121, thereby rotating the rotor clockwise or counterclockwise.

The speed adjusting valve 16 has an axial passageway 161 that is communicated with the intake passageway 113, and a plurality of radial holes 162 that are communicated with the axial passageway 161 and that have different diameters. Any of the radial holes 162 can be communicated with the connecting passageway 110 by rotating the valve 16 relative to the handle 112. The larger the diameter of the radial hole 162 communicated with the connecting passageway 110, the faster the tool head rotates. The air controlling mechanism 17 includes a sliding rod 171 that is mounted movably within the mounting passageway 114. The sliding rod 171 has an upper end that contacts a pressing plate 172, and a lower end, which contacts a ball 175 that is biased by a spring 174 and that is located under a sealing washer 173. A connector 176 is mounted threadably within a lower end of the mounting passageway 114.

To rotate the tool head counterclockwise, the control rod 152 is positioned so that one of the annular grooves 153 in the control rod 152 is communicated with the intake port 154 and the reverse air-controlling passageway 156 in the tubular member 151. Under this circumstance, upon depression of the pressing plate 172, the ball 175 moves downward to separate from the washer 173 so as to permit air flow from the connector 176 into the rotor through a flow path, which consists of the connecting passageway 110, one of the radial holes 162, the axial passageway 161, the intake passageway 113, the intake port 154, the reverse air-controlling passageway 156, the passageways 116, the reverse guiding slot 142, and the reverse port 123. The rotational direction of the tool head can be varied by moving the control rod 152 within the tubular member 151. The rotational speed of the tool head can be adjusted by rotating the valve 16 in the tool 1.

Numerous elements and passageways are provided in the rotational-direction controlling mechanism 15 and the speed adjusting valve 16, thereby resulting in a complicated structure for the tool 1. Furthermore, high precision is needed to ensure the structural relationship between the tubular member 151 and the positioning hole 115 and between the tubular member 151 and the control rod 152. Accordingly, a single apparatus is required to perform the functions of adjusting the rotational speed of the tool head and controlling the rotational direction of the tool head for simplifying the construction of the power tool.

SUMMARY OF THE INVENTION

The object of this invention is to provide a pneumatically driven power tool with a speed adjusting apparatus, which can be operated easily to vary the rotational direction of a tool head and which has a simple structure that does not need a high precision.

According to this invention, a speed adjusting apparatus for a pneumatically driven power tool includes a control valve that is adapted to mounted rotatably within an intake passageway in an outer housing. A connecting rod extends through a pivot hole in a rear cover, and interconnects the valve and a rotary member that is disposed rotatably on the rear cover in such a manner that the valve rotates synchronously with the rotary member. The rotary member can be rotated to align an intake outlet passageway in the valve with a selected one of a forward passageway and a reverse passageway in the rear cover. When the intake outlet passageway is aligned with the forward passageway, a tool head rotates in a direction. When the intake outlet passageway is aligned with the reverse passageway, the tool head rotates in the opposite direction. The tool head rotates at a speed, which depends on the intersecting area between the intake outlet passageway and the selected one of the forward passageway and the reverse passageway that is determined by the rotational angle of the rotary member relative to the rear cover.

BRIEF DESCRIPTION OF THE DRAWINGS

These and other features and advantages of the invention will become apparent in the following detailed description of a preferred embodiment, with reference to the accompanying drawings, in which.

DETAILED DESCRIPTION OF THE PREFERRED EMBODIMENT

Figure 1:
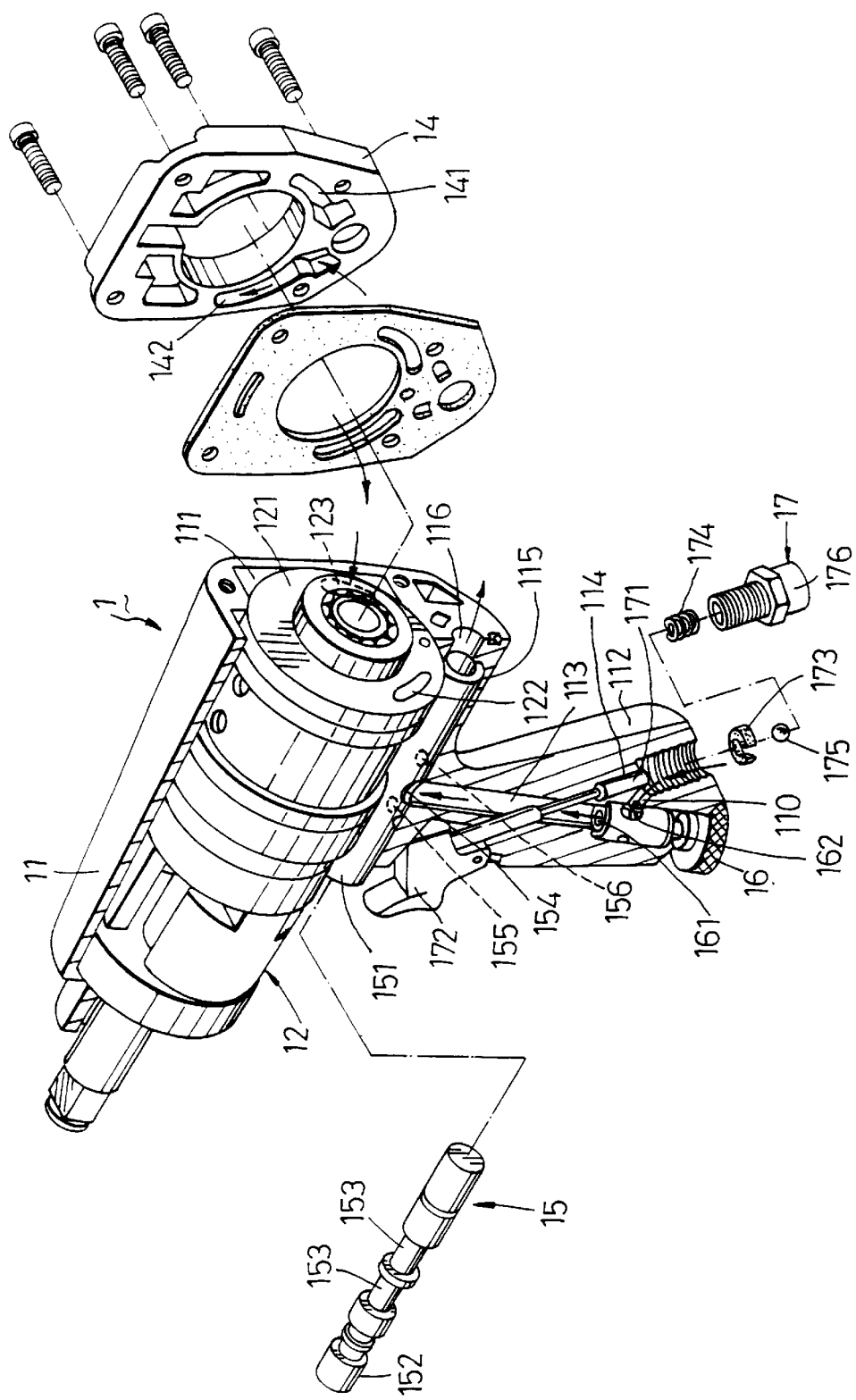
FIG. 1 is a partly exploded perspective view of a conventional pneumatically driven power tool.
Figure 2:
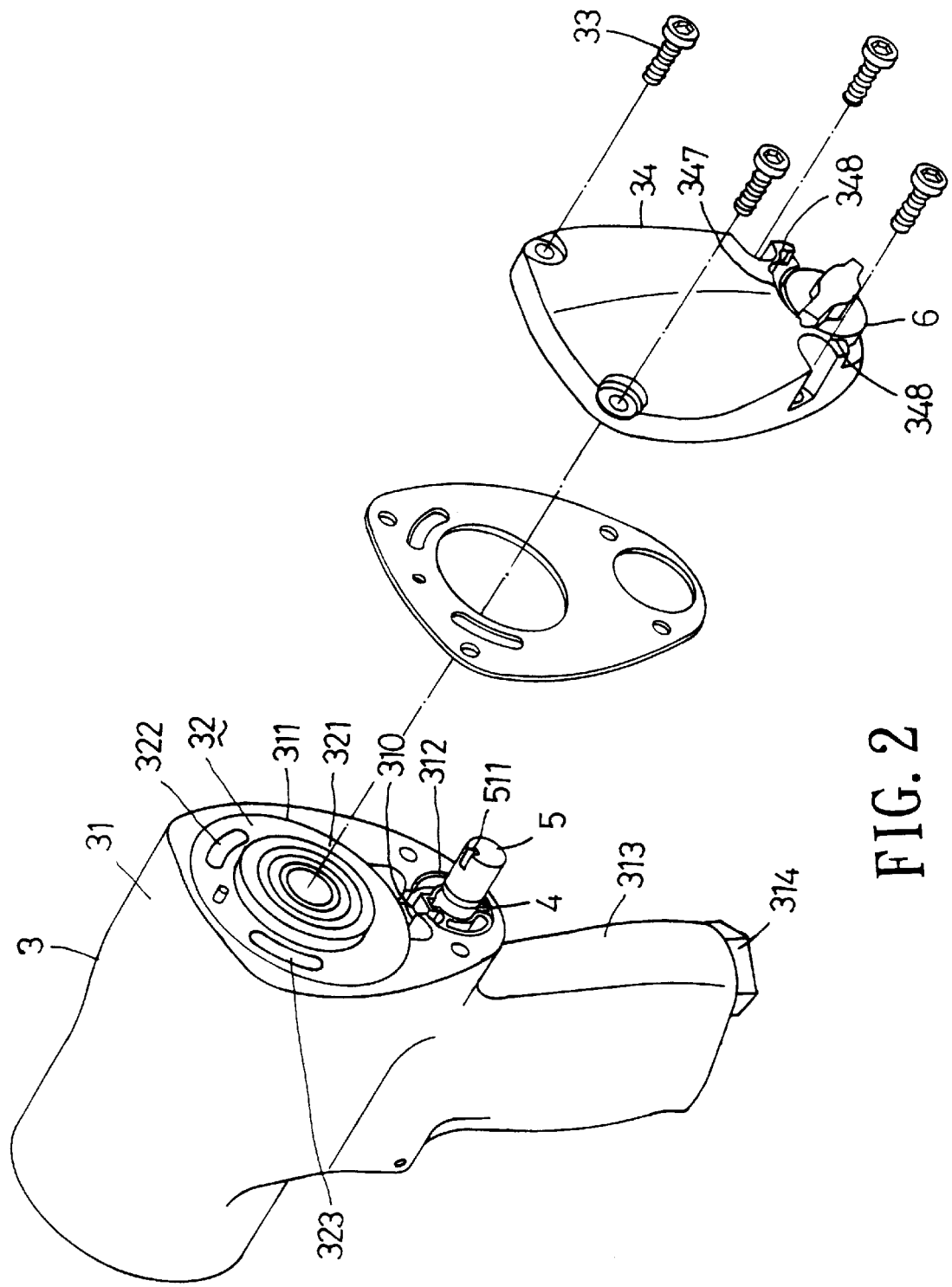
FIG. 2 is a partly exploded perspective view of a pneumatically driven power tool, which is provided with the preferred embodiment of a speed adjusting apparatus according to this invention.
Figure 3:
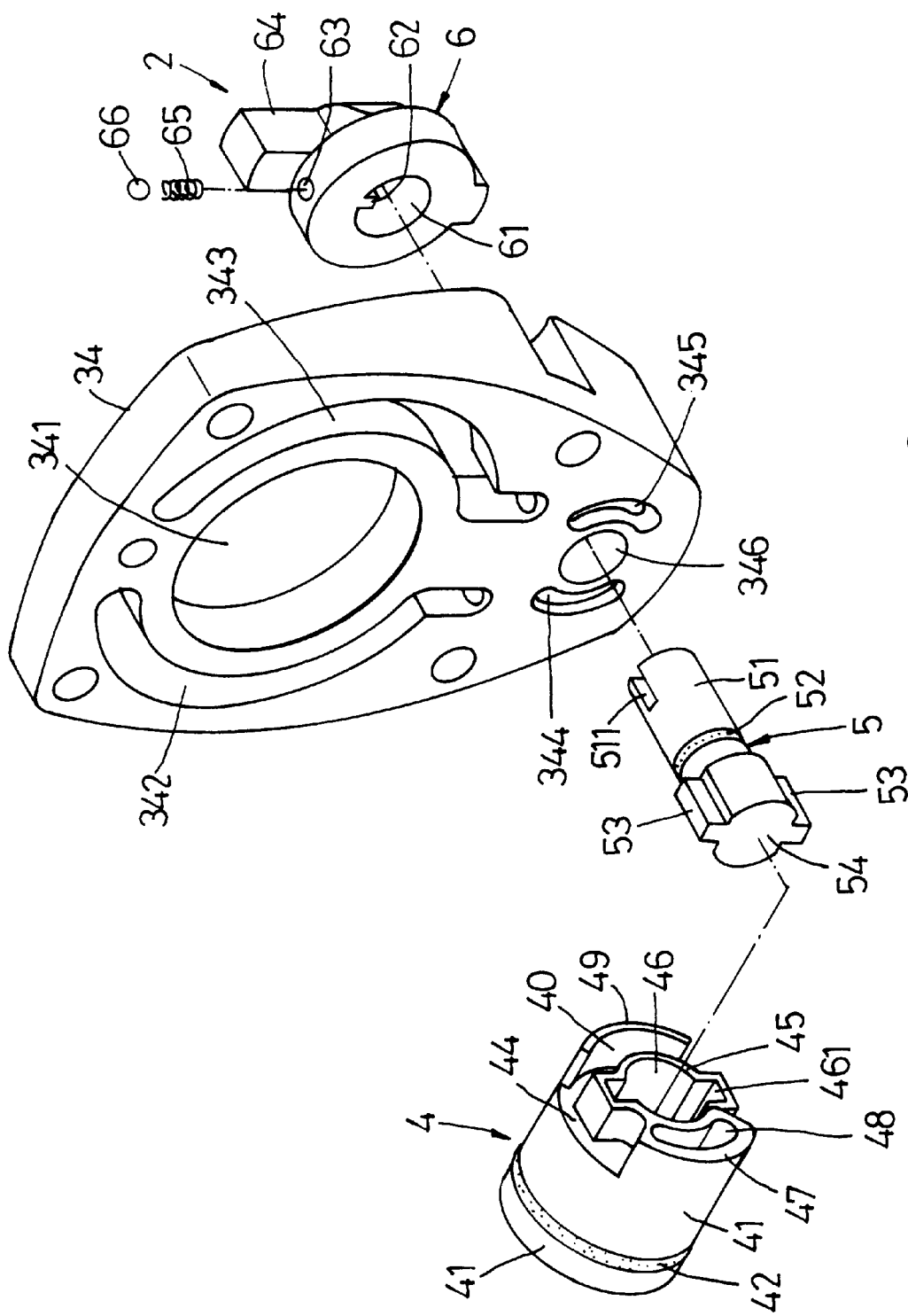
FIG. 3 is an exploded perspective view of the preferred embodiment.
Figure 4:
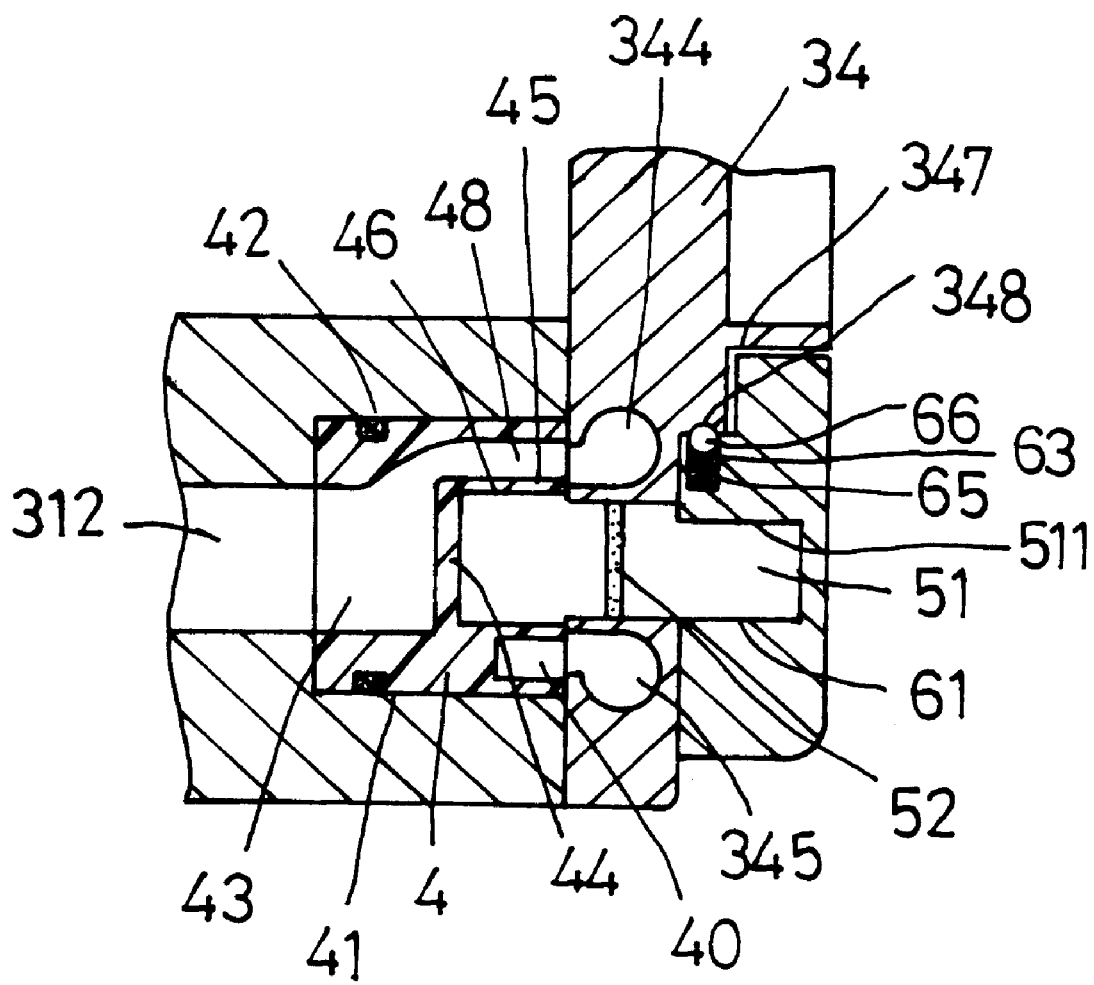
FIG. 4 is an assembled sectional view of the preferred embodiment.

Referring to FIGS. 2, 3 and 4, the preferred embodiment of a speed adjusting apparatus 2 for a pneumatically driven power tool 3 is shown to include a unitary control valve 4, a connecting rod 5 and a rotary member 6. The tool 3 has an outer housing 31, which is formed with a chamber 311 and an intake passageway 312 that is located under the chamber 311 and that is communicated with the chamber 311 by an exhaust passageway 310. The passageways 310, 312 extend into a handle 313 that is provided on the outer housing 31. An air introducing mechanism 314 is mounted within a lower end of the intake passageway 312. A driving mechanism 32 is disposed in the chamber 311, and includes a rear bearing member 321, which has a forward hole 322 and a reverse hole 323 formed therethrough. A rear cover 34 is mounted fixedly on a rear end portion of the outer housing 31 by bolts 33, and has a circular front recess 341, a forward guiding slot 342, a reverse guiding slot 343, a forward passageway 344, a reverse passageway 345, a pivot hole 346, a rear recess 347, and a plurality of axially extending positioning slots 348 (only one is shown in FIG. 4). The recess 341, the slots 342, 343, and the passageways 344, 345 are formed in a front surface of the rear cover 34. The rear recess 347 is formed in a rear surface of the rear cover 34. The positioning slots 348 are formed in a shoulder of the rear cover 34, which is formed in the rear recess 347. The forward passageway 344 is communicated with the forward guiding slot 342. The reverse passageway 345 is communicated with the reverse guiding slot 343. The pivot hole 346 is formed through the rear cover 34, and is located between the passageways 344, 345.

The valve 4 is formed from a plastic material, and has a valve wall 41 that is received fittingly within the intake passageway 312, an O-ring 42 sleeved on the wall 41, and an intake inlet passageway 43 formed in a front end surface of the valve 4. A transverse blocking plate 44 is fixed in the intake inlet passageway 43, and is perpendicular to the axis of the intake inlet passageway 43. The valve 4 has an internally splined rear end portion 45, which defines a bore 46 that has two aligned radial extensions 461, and a peripheral wall portion 47, which defines an intake outlet passageway 48 that is communicated with the intake inlet passageway 43. The intake outlet passageway 48 has a uniform cross-section, which has an area that is smaller than that of a front surface of the blocking plate 44 so that air flows into the intake inlet passageway 43 to push the blocking plate 44 rearward, thereby pressing a rear end surface of the valve 4 against the rear cover 34. A counterweight wall 49 is formed on the rear end portion of the valve 4, and is diametrically opposed to the peripheral wall 47, thereby defining an exhaust recess 40 between the splined rear end portion 45 and the counterweight wall 49.

The connecting rod 5 extends through the pivot hole 346 in the rear cover 34, and has a rear end portion 51 formed with a keyway 511, an O-ring 52 sleeved on a middle portion of the connecting rod 5, and an externally splined front end portion 54, which is received fittingly within the bore 46 in the valve 4 and which is formed with two aligned radial ribs 53 that engage respectively the radial extensions 461 of the bore 46 in the valve 4.

The rotary member 6 has a central hole 61 that engages the rear end portion 51 of the connecting rod 5, a key 62 that engages the keyway 511 in the connecting rod 5 to rotate the valve 4 synchronously with the rotary member 6, a radial hole 63, an actuation portion 64, a spring 65 that is received within the radial hole 63, and a ball 66 that is biased by the spring 65 to engage a selected one of the positioning slots 348 in the rear cover 34.

Figure 5:
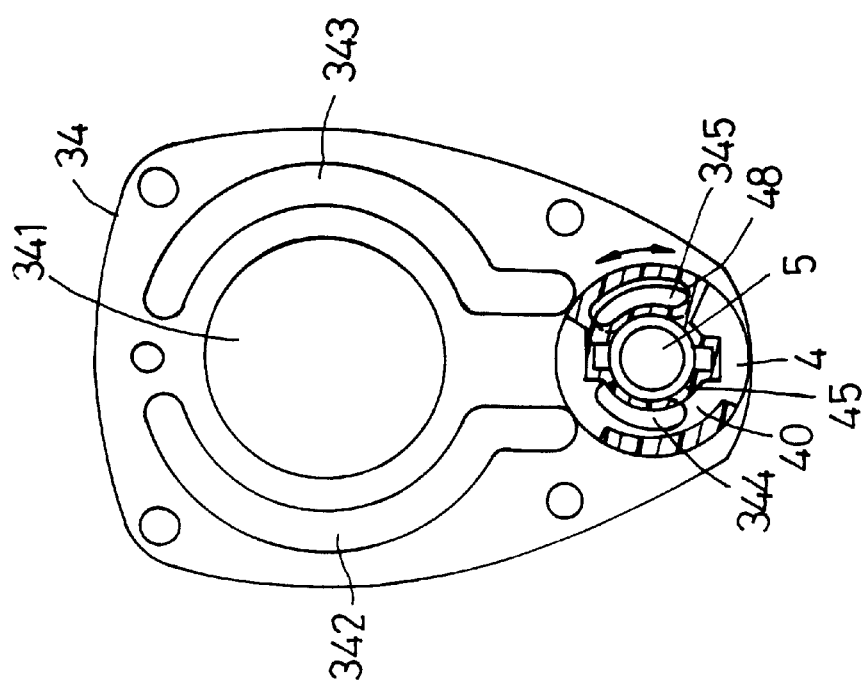
FIG. 5 is a schematic front view illustrating a position of a control valve of the preferred embodiment relative to a rear cover, in which a tool head rotates in a direction.

Referring to FIGS. 2, 3 and 5, when the intake outlet passageway 48 in the valve 4 is aligned with the reverse passageway 345 in the rear cover 34, air flows from the intake passageway 312 into the driving mechanism 32 through a flow path that consists of the intake inlet passageway 43, the intake outlet passageway 48, the reverse passageway 345, the reverse guiding slot 343, and the reverse hole 323. As such, a tool head (not shown) of the tool 3 rotates in a first direction. Subsequently, most of the air in the driving mechanism 32 flows into the exhaust passageway 310 in the outer housing 31. Some of the air in the driving mechanism 32 flows from the forward hole 322 into the exhaust passageway 310 through the forward guiding slot 342, the forward passageway 344 and the recess 40 due to back pressure. When it is desired to adjust the rotational speed of the tool head, the intersecting area between the intake outlet passageway 48 and the reverse passageway 345 is varied by rotating the rotary member 6 relative to the rear cover 34.

Figure 6:
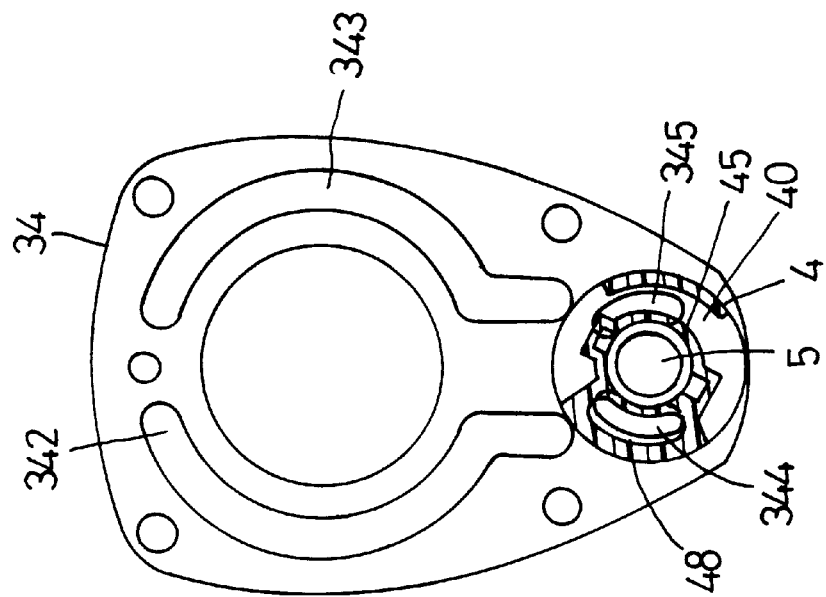
FIG. 6 is a schematic front view illustrating another position of the valve of the preferred embodiment relative to the rear cover, in which the tool head rotates in the opposite direction.

Referring to FIG. 3, 4 and 6, when it is desired to vary the rotational direction of the tool head, the rotary member 6 is rotated relative to the rear cover 34 so as to align the intake outlet passageway 48 with the forward passageway 344 in the rear cover 34. Under this circumstance, air flows from the intake outlet passageway 48 into the driving mechanism 32 through a flow path that consists of the forward passageway 344, the forward guiding slot 342, and the forward hole 322. Accordingly, the tool head rotates in a second direction that is opposite to the first direction.

The rotational direction and speed of the tool head can be adjusted easily by rotating the rotary member 6 relative to the rear cover 34.

With this invention thus explained, it is apparent that the numerous modifications and variations can be made without departing from the spirit and scope of this invention. It is therefore intended that this invention be limited only as indicated by the appended claims.

I claim:

1. A speed adjusting apparatus for a pneumatically driven power tool, the power tool including an outer housing and a rear cover that is mounted movably on the outer housing, the outer housing having an intake passageway for introduction of air into the outer housing, and an exhaust passageway for discharge of air from the outer housing, the rear cover having a pivot hole that is aligned with the intake passageway in the outer housing, a forward passageway and a reverse passageway, said speed adjusting apparatus comprising:

a control valve adapted to be mounted rotatably within the intake passageway in the outer housing and including a front end surface formed with an intake inlet passageway that is adapted to be communicated with the intake passageway and that has an axis, a rear end surface adapted to abut against the rear cover and having an intake outlet passageway that is communicated with said intake inlet passageway, and an exhaust recess that is adapted to be communicated with the exhaust passageway in the outer housing, and a transverse blocking plate that is fixed in said intake inlet passageway and that is perpendicular to said axis of said intake inlet passageway, air that flows into said intake inlet passageway pressing said rear end surface of said control valve against the rear cover;

a connecting rod adapted to extend through the pivot hole in the rear cover and having an inner end that is connected to said control valve for synchronous rotation with said control valve; and a rotary member adapted to be located on an outer surface of the rear cover and connected to said outer end of said connecting rod for synchronous rotation with said connecting rod, said rotary member being rotatable on the rear cover to align said intake outlet passageway with a selected one of the forward passageway and the rear passageway in the outer housing, speed of air flow between said intake outlet passageway and the selected one of the forward passageway and the reverse passageway being varied by adjusting intersecting area therebetween.

2. A speed adjusting apparatus as claimed in claim 1, wherein said control valve has an internally splined rear end portion, said connecting rod having an externally splined front end portion that engages fittingly said internally splined rear end portion of said control valve, thereby permitting synchronous rotation therewith.

3. A speed adjusting apparatus as claimed in claim 1, wherein said rotary member has a front end surface that is formed with a central hole, said connecting rod having a rear end portion that engages fittingly said central hole in said rotary member and that is formed with a keyway, said rotary member being formed integrally with a key that engages fittingly said keyway in said connecting rod to prevent relative rotation therebetween.

4. A speed adjusting apparatus as claimed in claim 1, the rear cover having a positioning cavity formed therein, wherein said rotary member is provided with a spring-biased ball that is adapted to engage the positioning cavity in the rear cover when said intake outlet passageway is aligned fully with the forward passageway in the rear cover.

5. A speed adjusting apparatus as claimed in claim 1, wherein said intake outlet passageway in said control valve has a uniform cross-section, said blocking plate having a front surface, which has an area that is larger than that of said cross-section of said intake outlet passage.

\* \* \* \* \*